March 4, 1969   S. L. LYONS   3,430,321
MEANS FOR ASSEMBLING TOGETHER IN COAXIAL RELATION
TWO PARTS OF DIFFERENT DIAMETER
Filed Dec. 17, 1965
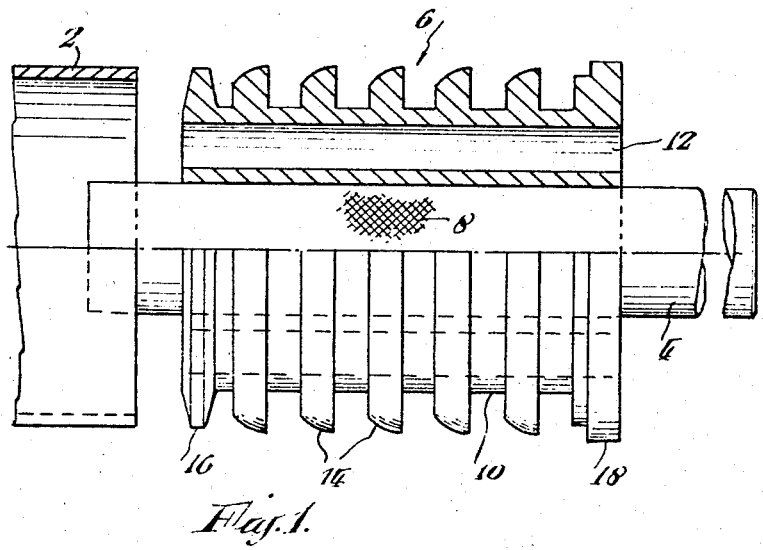
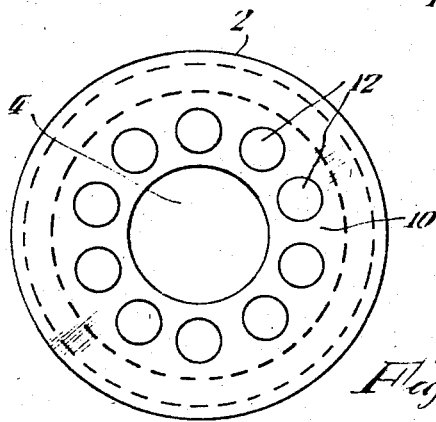
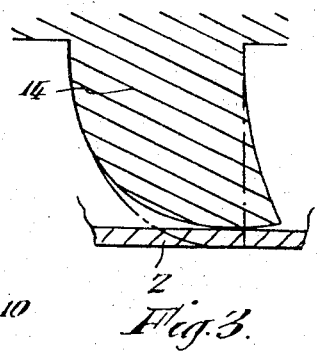
INVENTOR
STANLEY LEWIS LYONS

# United States Patent Office 3,430,321
Patented Mar. 4, 1969

3,430,321
MEANS FOR ASSEMBLING TOGETHER IN COAXIAL RELATION TWO PARTS OF DIFFERENT DIAMETER
Stanley Lewis Lyons, London, England, assignor to Hall Harding Limited, London, England, a company of Great Britain and Northern Ireland
Filed Dec. 17, 1965, Ser. No. 514,545
U.S. Cl. 29—129          6 Claims
Int. Cl. B60b 7/06; B21b 31/08; B29c 17/00

This invention relates to means for assembling together in coaxial relation two parts of different diameter. For example in the assembly of a shaft or stub shaft inside a roller such as is used in belt conveyor systems. Another example is for the construction of rollers for printing machines.

The manufacture of such a roller from a tube involves the mounting of a shaft to the tube so that the shaft end extends beyond the tube for mounting in bearings. One of the principal requirements is that the shaft be concentric and axially true to the outer surface of the tube. It has been common hitherto to place a continuous shaft right through the tube which shaft is secured to the tube at each end by means of an accurately fitted plug of metal.

It is obviously uneconomical to use a continuous shaft but this introduces the problem of mounting stub shafts accurately and securely in the ends of the tube. In the past the mounting of the shaft or stub shafts has entailed the use of accurately machined end plugs which are fitted into internal machined surfaces at each end of the tube. When using stub shafts the end plugs and internal bores must obviously be of a greater depth than when the inner shaft is continuous. It was therefore necessary to provide a method of fixing the end plugs to the shaft and tube after assembly and this included welding, brazing, soldering, pressing, shrink fitting, pinning or screwing.

The methods outlined above were most often used in conjunction with thick walled tubing so that deformation of the outer diameter of the plug was kept to a minimum but often it was necessary to machine the complete outer surface of the shaft and tube in order that a concentric assembly resulted. Even so it was often found that due to variation in wall thickness an unbalanced roller was produced by this method.

The now available thin walled electrical resistance welded tubing presents a very attractive alternative tube material. However such thin wall tubing does not readily permit the use of the above method of construction. The wall is too thin to be economically machined and is too readily deformable to permit the use of pressed in metallic plugs and is too easily deformed by heat.

According to the present inevntion there is provided means for assembling together in coaxial relation, two parts of different diameter which includes a shaft having secured thereto a plug of resiliently deformable material, said plug having outer peripheral portions arranged to be received in and be resiliently deformed by a central bore in the other part. The plug may be secured to the shaft by being moulded thereon or bonded thereto.

The device is preferably applied to the assembly of a roller in which case it includes a tube, a pair of stub shafts and a pair of plugs.

The outer peripheral portions preferably take the form of a plurality of annular projections axially spaced along the plug.

Preferably, the plug is made of a mouldable material, such as nylon or other natural or synthetic elastomer of the required degree of hardness, and where such materials are used the plug may be moulded directly onto the stub shaft. We have found that for diazo printing machine rollers a nylon of 75° to 80° Shore hardness is suitable.

It is a property of nylon that, after the anhydrous nylon has been moulded, it absorbs water from its surroundings and in doing so swells before it becomes dimensionally stable. Some other synthetic materials to a usually lesser degree may also exhibit this property. In the manufacture from nylon of plugs according to the present invention, the assembly of the parts can be carried out in various ways to take account of this curing phenomenon. As with materials which are dimensionally stable after moulding, the moulded plug may, for example, be cured before assembly and force-fitted into the hollow shaft but alternatively it may be made of such a size that it is a relatively easy fit into the tube in its uncured state, the curing then being carried out after assembly so that it expands to grip the inner periphery of the tube, the annular projections being deformed only at this stage.

When a plug according to the invention is intended to be assembled in the first manner, it is desirable that the annular projections have an outer periphery of conical or other tapered or partly-tapered form increasing in diameter from the leading edges of the projections in the direction of insertion. For force fitting and making allowance for manufacturing tolerances the minimum diameter of the periphery must be slightly greater than the largest expected internal diameter of the hollow shaft to produce the required interference fit. The plug may also comprise a leading annular member preceding the projections and having a diameter smaller than the hollow shaft internal diameter to guide the plug into the tube. There can also be provided a rear annular member following the projections and having a diameter larger than that of the tube to act as an end abutment to limit the penetration. If desired, this rear member can have a stepped profile with the smaller diameter portion leading and fitting within the tube.

The present invention will now be described in greater detail by way of example with reference to the accompanying drawings, wherein:

FIG. 1 is a longitudinal part sectional view of a preferred form of stub shaft and plug assembly for the roller of a belt conveyor of a diazo printing machine, the assembly being shown about to be pressed into the tube;

FIG. 2 is an end view of the assembly shown in FIG. 1 after being pressed into the tube; and FIG. 3 is a fragmentary longitudinal section to an enlarged scale showing the shape assumed by an annular projection when within the tube. The roller to be assembled comprises a tube, a pair of stub shafts and a plug.

The electrical resistance welded steel tube 2 is hollow and has an external diameter of 1.5″ and an internal diameter of 1.4″. The solid stub shaft 4 has a diameter of 0.5″. The means for assembling these two parts consists of a plug of nylon 6 which is moulded upon the stub shaft and the dimensions given below are for the plug in the uncured state. For adequate keying of the plug to the surface of the stub shaft, the latter is knurled at 8 or may be grooved.

The nylon plug 6 comprises a tubular body 10 having an outer diameter of 1.088″ and there are ten equally spaced 0.172″ holes 12 in the body parallel to its axis and on a 0.8″ pitch circle diameter. From the body 10 project five equally-spaced annular projections 14 with a convex peripheral profile so that the outer diameter varies between 1.28″ at a front edge to 1.40″ at a rear edge of each projection 14. At the leading end of the plug 6 there is provided an annular member 16 having a profile of trapezoidal form, its outer diameter being 1.37″, i.e., less than the internal diameter of the tube 2. The other end of the plug terminates in a rear annular member 18 having a stepped profile with a maximum diameter of 1.47" at the rear face of the plug so that this member acts to limit the penetration of the plug 6 into the tube 2.

When the plug 6 together with the stub shaft 4 it has been formed upon is removed from the mould, it can be left for a number of days to cure but preferably this step is accelerated by immersing the plug in water at 95° C. for about twenty-four hours. In either case, the spaced holes 12 in the body expose a greater surface area and thereby assist the curing operation. When sufficient water has been absorbed to stabilise the dimensions of the plug, it is forced into the tube 2 using a press since the annular projections 14 now have a maximum diameter greater than the internal diameter of the tube 2. The deformation thereby imparted to the projections 14 is shown in FIG. 3.

An alternative assembly procedure which may have particular application where the sizes of the components are large does not employ the preliminary curing operation. Instead, the plug is taken direct from the mould (or from storage in a dry atmosphere) and placed in the tube while uncured, it then being quite an easy fit. The curing operation is then allowed to take place with the parts assembled together. To accelerate the process, steam may be blown through the series of holes 12 in the body 10 of the plug 6 and as the curing continues the plug 6 expands to grip the inner wall of the tube 2.

It will be appreciated that the assembly of the parts as described above is simple, cheap and robust, moreover the hard wearing properties and resilience of nylon enable the plug to be designed so that there is no likelihood of slipping occurring due to wear while it is found that the nylon has a damping effect on vibrations and this results in relatively quiet running of the roller. In addition, it is found that the self-centering properties of the particular design described prevent minor excrescence, such as the small welding flash and/or spatter produced by the electrical resistance welding process on the inner periphery of the tube 2 from having any significant effect on the alignment of the stub shaft 4 and tube 2.

In practice we have found that the maximum eccentricity experienced has not exceeded a total indicator reading of 0.003" measured on the shaft at 1" from the outer face of the plug 6 which is regarded as a surprising result on test attempts to remove the shaft by direct pull has resulted in the visible elongation of the shaft before the plug was withdrawn. In another test efforts were made to remove the plug by applying a lateral force to the shaft representing a condition of heavy overload. The plug was deformed severely but after a rest period the shaft 4 and tube 2 returned to their previous concentric alignment. This was also regarded as a surprising result in spite of the known memory property of nylon.

I claim:
1. A coupling assembly for connecting in coaxial driving relation a hollow tubular member and a solid shaft, comprising:
   a resiliently deformable plug molded about said shaft and adapted to have at least portions thereof inserted into said tubular member,
   said plug having a plurality of annular tapered projections, said tapered projections increasing progressively radially outwardly as a function of axial distance in the direction of plug insertion into said tubular member and said tapered projections being deformable upon insertion into said tubular member,
   said plug including a leading annular projection of a diameter smaller than the internal diameter of said tubular member for guiding said plug into said tubular member, and said plug including an annular trailing end projection having a diameter larger than the internal diameter of said tubular member so as to constitute an abutment limiting insertion of said plug and said shaft into said tubular member.

2. An assembly as defined in claim 1 wherein the peripheral portions of said annular tapered projections are of an essentially frusto-conical configuration increasing in diameter from the leading edges of said projections.

3. An assembly as defined in claim 1 wherein said plug is constituted of an elastomeric material.

4. An assembly as defined in claim 1 wherein said plug is constituted essentially of nylon.

5. An assembly as defined in claim 1 wherein said tubular member comprises a roller, and said shaft comprises a stub shaft extending from one end of said roller.

6. An assembly as defined in claim 1 wherein trailing end projection has a stepped annular rim configuration, the smaller diametral portion of which is insertable into said tubular member, and the larger diametral portion forming said abutment.

References Cited

UNITED STATES PATENTS 2,872,060  2/1959  Brüne et al. _____ 215—47

LOUIS O. MAASSEL, *Primary Examiner.*

U.S. Cl. X.R.

264—249